United States Patent Office 3,021,347
Patented Feb. 13, 1962

3,021,347
PROCESS FOR HYDROLYZING 16,17 STEROID ACETONIDES
George R. Allen, Evansville, Ind., and Michael Marx, Leonia, and Martin J. Weiss, Oradell, N.J., assignors to American Cyanamid Company, New York, N.Y., a corporation of Maine
No Drawing. Filed Oct. 13, 1959, Ser. No. 846,054
6 Claims. (Cl. 260—397.45)

This invention relates to a process for hydrolyzing 16,17-substituted methylenedioxy steroids to the corresponding 16,17-dihydroxy steroids.

In the prior art various attempts to hydrolyze 16,17-steroid acetonides have met with failure: G. Cooley et al., J. Chem. Soc., p. 4373 (1955); J. Fried et al., J. Am. Chem. Soc. 80, p. 2338 (1958).

We have now found that the 16,17-substituted methylenedioxy steroids can be hydrolyzed to the corresponding 16,17-dihydroxy steroids by the use of acids having a particular pKa value in the presence of a sufficient amount of water as described hereinafter.

The reaction which takes place in ring D of the steroid nucleus can be illustrated as follows:

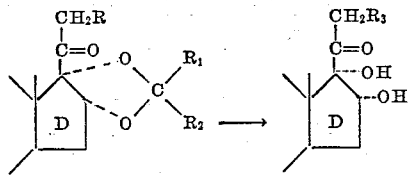

in which R is hydrogen or a hydroxyl or lower alkanoyloxy radical; $R_1$ and $R_2$ are hydrogen or lower alkyl radicals, and $R_3$ is hydrogen or a hydroxyl radical.

The process of the present invention is carried out by heating the 16,17-substituted methylenedioxy steroid in the presence of an acid having an acid dissociation constant (determined at 25° C.) within the range of $1 \times 10^{-3}$ to $1 \times 10^{-6}$ and a concentration in water of from 20 to 60% acid. While the hydrolysis will take place within the above range, it is preferred that the range be from 40% to 60% acid. The mixture is heated at a temperature within the range of 50° to 110° C. for a period of from 10 minutes to 12 hours.

The 16,17-steroid acetonides of the present invention used as starting material can be for example 16α,17α-isopropylidenedioxy progesterone;
16α,17α-isopropylidenedioxy-1,4-pregnadiene-3,20-dione;
4-bromo-16α,17α-isopropylidenedioxy-1,4-pregnadiene-3,20-dione;
16α,17α-isopropylidenedioxy-4,9(11)-pregnadiene-3,20-dione;
9α-fluoro-16α,17α-isopropylidenedioxy-11β,21-dihydroxy-1,4-pregnadiene-3,20-dione;
9α-fluoro-16α,17α-isopropylidenedioxy-11β-hydroxy-1,4-pregnadiene-3,20-dione;
9α-fluoro-16α,17α-isopropylidenedioxy-11β-hydroxy-4-pregnene-3,20-dione;
9α-fluoro-16α,17α-isopropylidenedioxy-11β,21-dihydroxy-4-pregnene-3,20-dione;
9α-bromo-11β-hydroxy-16α,17α-isopropylidenedioxy-4-pregnene-3,20-dione;
9α-bromo-11β-hydroxy-16α,17α-isopropylidenedioxy-4-pregnene-3,20-dione;
11β,21-dihydroxy-16α,17α-isopropylidenedioxy-4-pregnene-3,20-dione;
9α-chloro-11β-hydroxy-16α,17α-isopropylidenedioxy-1,4-pregnadiene-3,20-dione;
9α-fluoro-16α,17α-isopropylidenedioxy-1,4-pregnadiene-3,11,20-trione;

21-hydroxy-16α,17α-isopropylidenedioxy-1,4-pregnadiene-3,11,20-trione;
21-acetoxy-9α-fluoro-11β-hydroxy-16α,17α-isopropylidenedioxy-1,4-pregnadiene-3,20-dione;
9α-fluoro-11β,21-dihydroxy-16α,17α-isobutylidenedioxy-1,4-pregnadiene-3,20-dione;
21-acetoxy-9α-fluoro-16α,17α-isopropylidenedioxy-1,4-pregnadiene-3,11,20-trione;
9α-fluoro-11β,21-dihydroxy-16α,17α-isopropylidenedioxy-4,6-pregnadiene-3,20-dione;
9α-fluoro-11β,21-dihydroxy-16α,17α-isopropylidenedioxy-1,4,6-pregnatriene-3,20-dione;
11β,21-dihydroxy-16α,17α-isopropylidenedioxy-6α-methyl-4-pregnene-3,20-dione;
21-acetoxy-16α,17α-isopropylidenedioxy-11β-hydroxy-6α-methyl-4-pregnene-3,20-dione;
11β,21-dihydroxy-16α,17α-isopropylidenedioxy-6α-methyl-1,4-pregnadiene-3,20-dione;
9α-fluoro-11β,21-dihydroxy-16α,17α-isopropylidenedioxy-6α-methyl-1,4-pregnadiene-3,20-dione and the like. The preparation of these starting materials is described and claimed in an application of one of us, Serial No. 720,564, filed March 11, 1958, and a continuation in part application, Serial No. 742,742 filed June 18, 1958. The general method of these latter applications is the reaction of a 16α,17α-dihydroxy steroids with an alkanal or an alkanone in the presence of a mineral acid.

When the reaction is complete, the product is recovered from the reaction mixture by well known means such as cooling the mixture and diluting with water to precipitate the product. The product can be further purified by crystallization from organic solvents.

The 16,17-dihydroxy steroids prepared by the process of the present invention are well known for their glucocorticoid activity, natriuresis and progestational activity. Compounds such as triamcinolone are included in this group. The process of the present invention can be used as the final steps in the purification of 16,17-dihydroxy steroids whereby the acetonides are prepared and separated from impurities and then the 16,17-dihydroxy steroids reconstituted by the present process.

The following examples illustrate the process of hydrolyzing 16,17-steroid acetonides to the corresponding 16,17-dihydroxy steroids.

EXAMPLE I

*Preparation of 16α,17α-dihydroxyprogesterone*

One gram of 16α,17α-isopropylidenedioxyprogesterone and 30 ml. of 60% formic acid (acid dissociation constant=$2.14 \times 10^{-4}$) are heated on the steam-bath for 30 minutes. The hot solution is then diluted to turbidity with water and cooled to give the product which is recrystallized from methylene chloride-petroleum ether. Melting point 219–223° C.; $[\alpha]_D^{25}+92°$ (c 1.04, chloroform) and max. 241 mμ ($\epsilon$=16,100). The yield is 63%.

EXAMPLE II

*Preparation of 16α,17α-dihydroxy-1,4-pregnadiene-3,20-dione*

One gram of 16α,17α-isopropylidenedioxy-1,4-pregnadiene-3,20-dione and 30 ml. of 60% formic acid are heated on the steam-bath for 30 minutes. The hot solution is diluted to turbidity with water and cooled to give the product which is recrystallized from acetone-petroleum ether giving white needles, melting point 209–211° C.; $[\alpha]_D^{25}+28.2°$ (c 0.4, methanol); λ max. 244 mμ ($\epsilon$=15,300), λ max. 2.97, 5.86, 6.03, 6.19, 6.26 μ. The yield is 45%.

EXAMPLE III

*Preparation of 16α,17α-dihydroxy-1,4-pregnadiene-3,20-dione*

One gram of 16α,17α-isopropylidenedioxy-1,4-pregnadiene-3,20-dione and 55 ml. of acetic acid-water solution (the acid dissociation constant of acetic acid is $1.86 \times 10^{-5}$) in the proportion of 5 parts of acetic acid to 4 parts of water are allowed to reflux for 6 hours. After this time, the hot solution is diluted to turbidity with water and cooled to give the product which is recrystallized from acetone-petroleum ether. This is a product identical with that of Example II. The yield is 26%.

EXAMPLE IV

*Preparation of 4-bromo-16α,17α-dihydroxy-1,4-pregnadiene-3,20-dione*

One gram of 4-bromo-16α,17α-isopropylidenedioxy-1,4-pregnadiene-3,20-dione and 55 ml. of 5:4 acetic acid-water solution are refluxed for 6 hours. The hot solution is then diluted to turbidity with water and cooled to give the product which is recrystallized to yield white needles, melting point 227–229° C.; $[\alpha]_D^{25} - 21.5°$ (c 1.1, chloroform); λ max. 244 mμ (ε=15,300); λ max. 3.00, 5.88, 6.02, 6.26μ; yield 50%.

EXAMPLE V

*Preparation of 16α,17α-dihydroxy-1,4-pregnadiene-3,20-dione*

One gram of 16α,17α-isopropylidenedioxy-1,4-pregnadiene-3,20-dione and 55 ml. of 5:4 acetic acid-water solution are refluxed for 6 hours. The solution is concentrated to about one-half volume and slowly diluted with water to turbidity while hot. The solution is then cooled to give 0.33 g. of near white crystals; melting point 182–190° C. after sintering at 170° C. This material is recrystallized from acetone-petroleum ether to give 0.145 g. of white needles melting at 209–211° C.

EXAMPLE VI

*Preparation of 16α,17α-dihydroxy-4,9(11)-pregnadiene-3,20-dione*

One gram of 16α,17α-isopropylidenedioxy-4,9(11)-pregnadiene-3,20-dione and 30 ml. of 60% formic acid are heated on the steam-bath for 30 minutes. The hot solution is diluted to turbidity with water and cooled to give 0.582 g. of near white needles, melting at 212–215° C. This material is recrystallized from acetone-petroleum ether to give 0.560 g. of needles melting at 220–223° C.; $[\alpha]_D^{25} +66°$ (c 1.166, methanol). The yield is 65%.

EXAMPLE VII

*Preparation of 9α-fluoro-11β,16α,17α,21-tetrahydroxy-1,4-pregnadiene-3,20-dione (triamcinolone)*

9α-fluoro-16α,17α-isopropylidenedioxy-11β,21-dihydroxy-1,4-pregnadiene-3,20-dione (0.357 g.) and 10 ml. of 60% formic acid are heated on the steam-bath for 30 minutes. A small amount of undissolved solid is removed by filtration and the hot filtrate is diluted to turbidity with water. The solution is chilled and filtered to give 0.102 g. of white solid melting at 250–260° C. dec. An additional 98 mg. of solid is recovered from the filtrate.

EXAMPLE VIII

*Preparation of 9α-fluoro-11β,16α,17α-trihydroxy-1-4-pregnadiene-3,20-dione*

9α-fluoro-16α,17α-isopropylidenedioxy-11β-hydroxy-1,4-pregnadiene-3,20-dione (0.797 g.) and 20 ml. of 60% formic acid are heated on the steam-bath for 30 minutes. The solvents are removed under reduced pressure on the steam-bath, and the residue is distributed between 100 ml. of water and 100 ml. of methylene chloride. The methylene chloride solution is dried over magnesium sulfate and taken to dryness to give 0.669 g. of product.

In the preceding examples all melting points were determined in a capillary tube and are uncorrected. The ultraviolet spectra were determined in methanol solution on a Cary recording spectrophotometer. The infrared spectra (pressed potassium bromide disc) were determined with a Perkin-Elmer spectrophotometer (model 21). Optical rotations were determined in a 1-dm. semi-micro tube, and all evaporations were carried out under reduced pressure unless otherwise specified. Except where otherwise noted, the petroleum ether used was that fraction boiling at 60–70°.

We claim:

1. A method of preparing 9α-fluoro-11β,16α,17α,21-tetrahydroxy-1,4-pregnadiene-3,20-dione which comprises heating to a temperature within the range of 50° to 110° C. 9α-fluoro-16α,17α-isopropylidenedioxy-11β,21-dihydroxy-1,4-pregnadiene-3,20-dione with an aqueous formic acid solution consisting of not less than 20% and not more than 60% formic acid the remainder of the aqueous acid solution being water.

2. A method of preparing 16α,17α-dihydroxy-4,9(11)-pregnadiene-3,20-dione which comprises heating to a temperature within the range of 50° to 110° C. 16α,17α-isopropylidenedioxy-4,9(11)-pregnadiene-3,20-dione with an aqueous formic acid solution containing not less than 20% and not more than 60% formic acid the remainder consisting of water.

3. A method of preparing 9α-fluoro-11β,16α,17α-trihydroxy-1,4-pregnadiene-3,20-dione which comprises heating to a temperature within the range of 50° to 110° C. 9α-fluoro-16α,17α-isopropylidenedioxy-1,4-pregnadiene-3,20-dione with an aqueous formic acid solution containing not less than 20% and not more than 60% of formic acid the remainder consisting of water.

4. A method of preparing compounds of the formula:

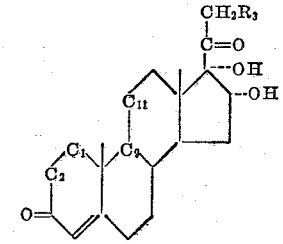

wherein $R_3$ is a member of the group consisting of hydrogen and a hydroxyl radical, $>C_9\text{---}C_{11}\text{---}$ is a trivalent radical of the group consisting of

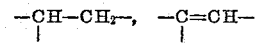

and

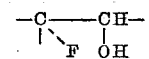

radicals and $\text{---}C_1\text{---}C_2\text{---}$ is a divalent radical of the group consisting of $\text{---}CH_2\text{---}CH_2\text{---}$ and $\text{---}CH=CH\text{---}$ radicals which comprises heating to a temperature within the range of 50° to 110° C., a steroid having the formula:

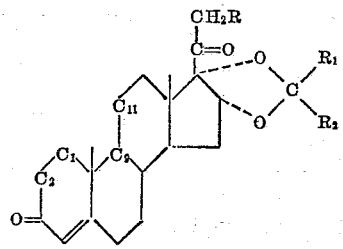

wherein R is a member of the group consisting of hydrogen, hydroxyl and lower alkanoyloxy radicals, $R_1$ and $R_2$ are members of the group consisting of hydrogen and lower alkyl radicals and

and —$C_1$—$C_2$— are as defined above, and a lower fatty acid, said acid being present in an amount within the range of 20 to 60%, the remainder consisting of water.

5. A method in accordance with claim 4 in which the lower fatty acid is formic acid.

6. A method in accordance with claim 4 in which the lower fatty acid is acetic acid.

References Cited in the file of this patent
UNITED STATES PATENTS 2,345,216     Reichstein _____ Mar. 28, 1944

OTHER REFERENCES

Mills et al.: J. Am. Chem. Soc., vol 81 (March 5, 1959), pages 1264 and 1265 (page 1264 necessary).